US012581052B2

(12) United States Patent　　　　　(10) Patent No.:　US 12,581,052 B2
Rakshit et al.　　　　　　　　　　　　　　(45) Date of Patent:　　Mar. 17, 2026

(54) CROWDSOURCED, DEMAND-BASED VOLUMETRIC VIDEO CREATION

(71) Applicant: International Business Machines Corporation, Armonk, NY (US)

(72) Inventors: Sarbajit K. Rakshit, Kolkata (IN);
Girish Padmanabhan, Pune (IN);
Aishwarya Pradeep, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 18/357,241

(22) Filed: Jul. 24, 2023

(65) Prior Publication Data

US 2025/0039354 A1　　Jan. 30, 2025

(51) Int. Cl.
H04N 13/388　　　　　(2018.01)
(52) U.S. Cl.
CPC ................................. H04N 13/388 (2018.05)
(58) Field of Classification Search
CPC .. H04N 13/388; H04N 23/633; H04N 23/635;
H04N 23/661; H04N 23/698; H04N 23/64; H04N 23/90; G06T 7/80
See application file for complete search history.

(56) References Cited

U.S. PATENT DOCUMENTS

| | | | | |
|---|---|---|---|---|
| 11,089,281 | B2 | 8/2021 | Begeja | |
| 11,257,233 | B2 * | 2/2022 | Siver | ..................... G01S 13/867 |
| 11,659,151 | B2 * | 5/2023 | Aflaki | ........................ G06T 7/41 |
| | | | | 345/419 |
| 12,387,433 | B2 * | 8/2025 | Hellge | .................... G06T 17/20 |
| 2021/0289194 | A1 | 9/2021 | May | |
| 2022/0038635 | A1 | 2/2022 | Hutsler | |
| 2022/0116577 | A1 | 4/2022 | Zavesky | |
| 2023/0252657 | A1 * | 8/2023 | Baruch | ..................... G06T 7/40 |
| | | | | 382/108 |
| 2024/0069627 | A1 * | 2/2024 | Vaish | ................... H04N 13/239 |

(Continued)

OTHER PUBLICATIONS

Anthony, Sebastian, "Google invents smart contact lens with built-in camera: Superhuman Terminator-like vision here we come", ExtremeTech, Apr. 15, 2014, 21 Pages.

(Continued)

*Primary Examiner* — Vijay Shankar
(74) *Attorney, Agent, or Firm* — Michael O'Keefe

(57)　　　　　　　ABSTRACT

According to one embodiment, crowdsourced volumetric video capture is provided. The embodiment may include receiving a video captured by a user of a subject. The embodiment may also include creating a geofence based on a reference area surrounding the received video. The embodiment may further include identifying one or more locations and one or more capture angles needed to generate a volumetric video of the subject. The embodiment may also include calculating and assigning a weight to the one or more locations and/or one or more capture angles based on an importance in generation of the volumetric video. The embodiment may further include identifying one or more photographic capture devices within the geofence. The embodiment may also include presenting the one or more locations, one or more capture angles, and the weight assigned to each location and/or each capture angle to a user associated with the photographic capture devices.

20 Claims, 2 Drawing Sheets

(56) References Cited

U.S. PATENT DOCUMENTS

2025/0088618 A1\*   3/2025   Westcott ............... G06V 10/82

OTHER PUBLICATIONS

Antunes, Jose, "Canon and IBM: using volumetric video to promote visual arts", ProVideo Coalition By Filmtools, Jul. 13, 2021, 4 Pages.

Canon, "Canon and IBM Japan Form Joint Business Operation Utilizing Volumetric Video Technology to Promote the Visual and Performing Arts", Canon Singapore, Jul. 7, 2021, 4 Pages.

Cohen, Andrew, "Welcome to the Netaverse, Where Brooklyn Nets Players Can Be Seen in a Whole New (3D) Light", Sports Business Journal, Feb. 3, 2022, 3 Pages.

DigiTech, "Samsung smart contact lenses with built in camera is at this point the new Samsung patent", DigiTech, YouTube, Apr. 2, 2018, 1 Page.

IBM, "Canon, Inc. and IBM Launch Collaboration in Entertainment and the Arts in Japan", IBM Newsroom, Jul. 15, 2021, 3 Pages.

Mojo, "Mojo Vision High Performance Micro-LED Displays", Mojo Vision Inc., 2023, 1 Page.

Perkins, Lisa, "The business benefits of volumetric video", BT Business, Jun. 17, 2021, 4 Pages.

Perkins Lisa. "From Healthcare to Retail, 3D Volumetric Video is Set to Transform Entire Industries", BT, Feb. 28, 2021, 4 Pages.

\* cited by examiner

100

200

CROWDSOURCED, DEMAND-BASED VOLUMETRIC VIDEO CREATION

BACKGROUND

The present invention relates generally to the field of computing, and more particularly to volumetric video.

Volumetric video relates to image capture of a subject using multiple capture feeds that, during post processing, are sequenced together to create an image with three-dimensional volume and is viewable from multiple angles at any specific moment of the video. Volumetric video, or volumetric capture, may be utilized in many technologic fields, including, but not limited to, hologram generation, three-dimensional environments, augmented reality, visual effects, video gaming, and virtual reality, and in a number of industries, including music, virtual productions and sports, fashion, and documentaries. Several techniques for capturing volumetric video currently exist and may be used in isolation or in combination, such as photogrammetry, LiDAR, motion capture, 360° video cameras, and light field cameras.

SUMMARY

According to one embodiment, a method, computer system, and computer program product for crowdsourced volumetric video capture is provided. The embodiment may include receiving a video captured by a user of a subject. The embodiment may also include creating a geofence based on a reference area surrounding the received video. The embodiment may further include identifying one or more locations and one or more capture angles needed to generate a volumetric video of the subject. The embodiment may also include calculating and assigning a weight to the one or more locations and/or one or more capture angles based on an importance in generation of the volumetric video. The embodiment may further include identifying one or more photographic capture devices within the geofence. The embodiment may also include presenting the one or more locations, one or more capture angles, and the weight assigned to each location and/or each capture angle to a user associated with the one or more photographic capture devices.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
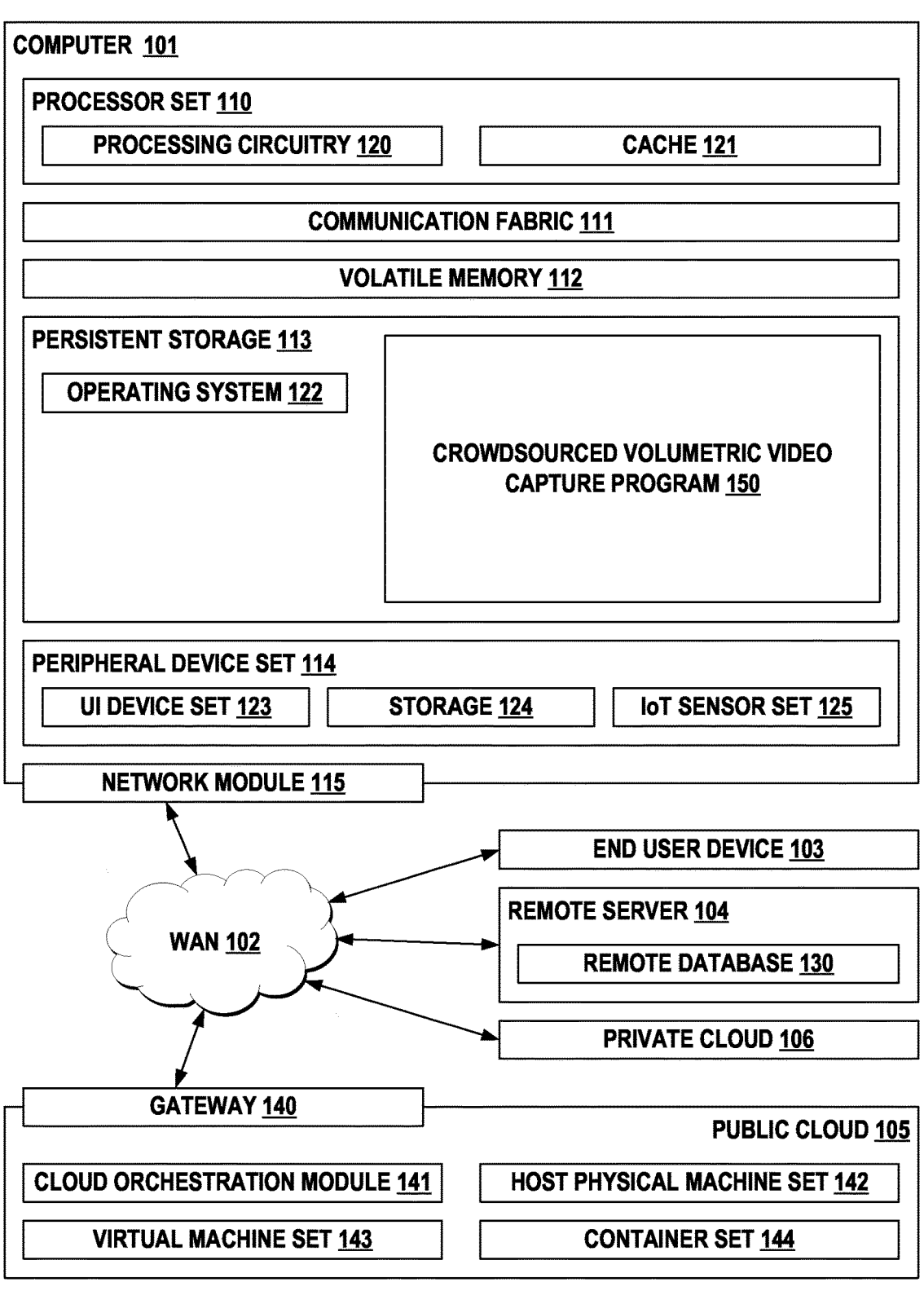
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to volumetric video. The following described exemplary embodiments provide a system, method, and program product to, among other things, utilize crowdsourced video capture when generating a volumetric video. Therefore, the present embodiment has the capacity to improve the technical field volumetric video by implementing the dynamic capabilities of crowdsourcing to enhance the quality, quantity, and efficiency of volumetric videos in the volumetric video generation process.

As previously described, volumetric video relates to image capture of a subject using multiple capture feeds that, during post processing, are sequenced together to create an image with three-dimensional volume and is viewable from multiple angles at any specific moment of the video. Volumetric video, or volumetric capture, may be utilized in many technologic fields, including, but not limited to, hologram generation, three-dimensional environments, augmented reality, visual effects, video gaming, and virtual reality, and in a number of industries, including music, virtual productions and sports, fashion, and documentaries. Several techniques for capturing volumetric video currently exist and may be used in isolation or in combination, such as photogrammetry, LiDAR, motion capture, 360° video cameras, and light field cameras.

In video capture and presentation of non-volumetric videos, individual video feeds are captured by individuals and published to a web portal, server, or local storage for future broadcast. With volumetric videos, feed capture at appropriate angles to generate the volumetric video may be more difficult in certain settings than in others. For example, fixed cameras installed throughout a sports arena may allow for proper volumetric video capture. However, such fixed cameras may be more difficult, or impossible, to properly install around a moving capture subject, such as a parade. A more mobile subject of volumetric video may require an alternative method of video capture. As such, it may be advantageous to, among other things, utilize crowdsourcing of individuals to capture dynamic, high quality video feeds at proper perspectives around a subject for adequate volumetric video generation.

According to at least one embodiment, a crowdsourced volumetric video capture program may receive videos captured and uploaded by one or more users to a server. The crowdsourced volumetric video capture program may analyze metadata associated with location and direction of capture of the uploaded videos to identify possible closed loop contours created by the users while capturing individual videos. The crowdsourced volumetric video capture program may calculate a weight to apply to each closed loop indicative of the demand or desirability for capture of one or more videos that will complete the closed loop contours based on the context of the captured videos. The crowdsourced volumetric video capture program may then calculate an incentive corresponding to the weight for the capture of a video in order to close the loop needed for volumetric video creation.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as crowdsourced volumetric video capture program 150. In addition to crowdsourced volumetric video capture program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and crowdsourced volumetric video capture program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in crowdsourced volumetric video capture program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in crowdsourced volumetric video capture program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the crowdsourced volumetric video capture program 150 may analyze one or more captured videos uploaded by one or more users to a server, such as remote server 104, to identify a need for volumetric video creation. If the crowdsourced volumetric video capture program 150 determine volumetric video creation is desired, the crowdsourced volumetric video capture program 150 may calculate a geofence around the contextual area of which the volumetric video may be created and identify relative positions and angles of desired video capture needed to generate the volumetric video. The crowdsourced volumetric video capture program 150 may then calculate and assign a weight to each relative position and angle based on the desirability of that relative position and angle. Upon receiving uploads of a threshold number of videos captured at relative positions and corresponding angles needed to complete the volumetric video, the crowdsourced volumetric video capture program 150 may generate and present the volumetric video either as a recording or as a livestream based on the uploaded videos.

Additionally, prior to initially performing any actions, the crowdsourced volumetric video capture program 150 may perform an opt-in procedure. The opt-in procedure may include a notification of the data the crowdsourced volumetric video capture program 150 may capture and the purpose for which that data may be utilized by the crowdsourced volumetric video capture program 150 during data gathering and operation. Furthermore, notwithstanding depiction in computer 101, the crowdsourced volumetric video capture program 150 may be stored in and/or executed by, individually or in any combination, end user device 103, remote server 104, public cloud 105, and private cloud 106. The crowdsourced volumetric video capture method is explained in more detail below with respect to FIG. 2.

Figure 2:
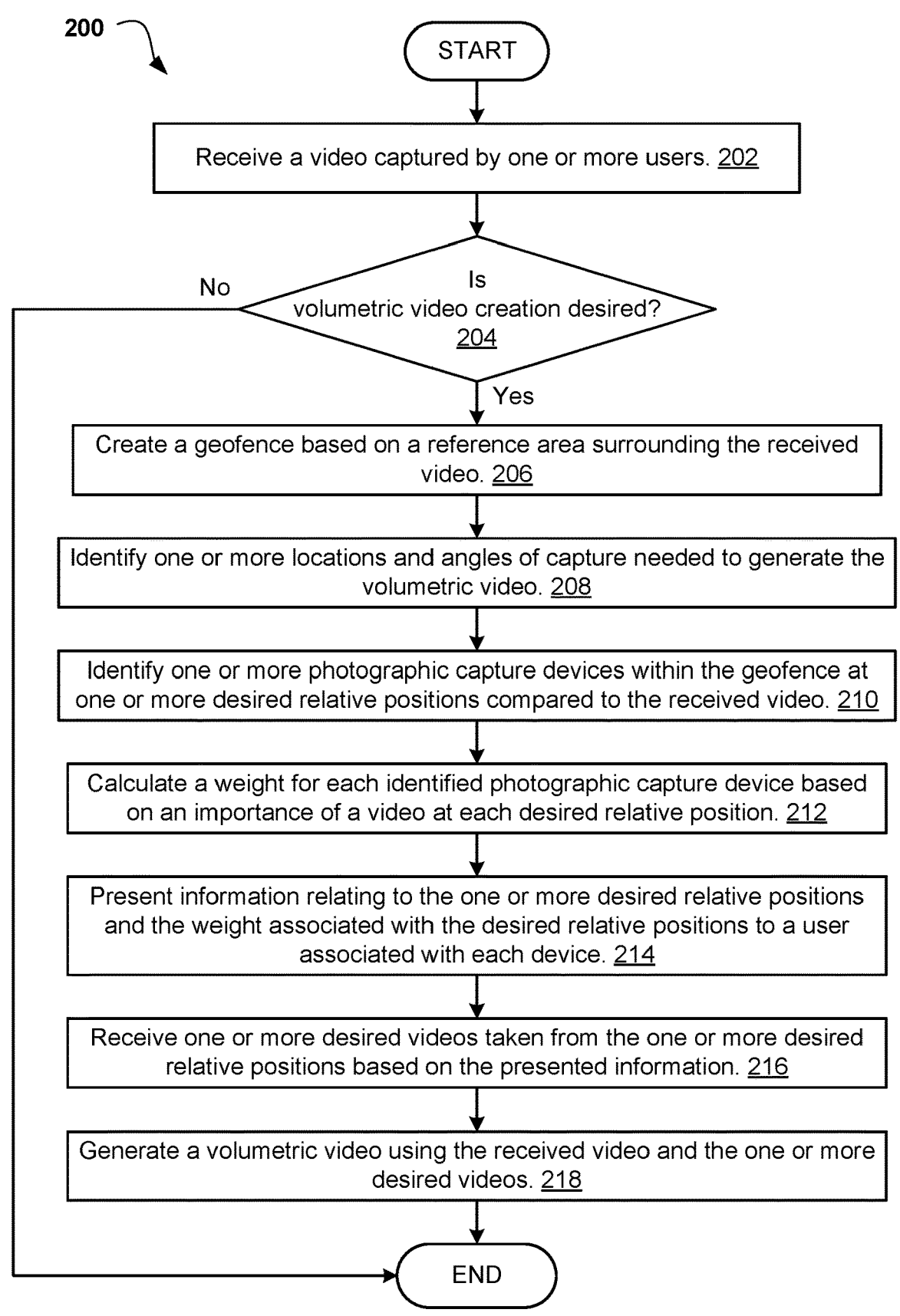
FIG. 2 illustrates an operational flowchart for a crowdsourced volumetric video capture process according to at least one embodiment.

Referring now to FIG. 2, an operational flowchart illustrating a crowdsourced volumetric video capture process 200 is depicted according to at least one embodiment. At 202, the crowdsourced volumetric video capture program 150 receives a video captured by one or more users. Upon capture of a video using a video capture device, the crowdsourced volumetric video capture program 150 may be configured to upload the captured video to a remote server for further analysis and possible creation of a volumetric video. The crowdsourced volumetric video capture program 150 may store the received video in the server, such as remote server 104, in a repository, such as remote database 130. Using location data associated with each received video, the crowdsourced volumetric video capture program 150 group and store videos captured within a preconfigured spatiotemporal threshold of each other together. For example, if the crowdsourced volumetric video capture program 150 receives two videos captured by separate users attending the same concert, the crowdsourced volumetric video capture program 150 may tag each video as having been recorded at the same event and may store the videos together.

Then, at 204, the crowdsourced volumetric video capture program 150 determines whether volumetric video creation is desired. The crowdsourced volumetric video capture program 150 may determine that volumetric creation is desired through an artificial intelligence analysis of a video stored in the remote server 104 using a video content analysis engine. The crowdsourced volumetric video capture program 150 may utilize the video content analysis engine to analyze the content of a video to identify the need or desire for further volumetric capture of the subject and/or environment within which the video was captured.

The crowdsourced volumetric video capture program 150 may determine a need and/or desire to capture move videos and generate a volumetric video based on various configurable factors including, but not limited to, subject type of the video, subject importance, and number of people observed in the video.

If the crowdsourced volumetric video capture program 150 determines volumetric video creation is desired (step 204, "Yes" branch), then the crowdsourced volumetric video capture process 200 may proceed to step 206 to create a geofence based on a relative area surrounding the received video. If the crowdsourced volumetric video capture program 150 determines volumetric video creation is not desired (step 204, "No" branch), then the crowdsourced volumetric video capture process 200 may terminate.

Next, at 206, the crowdsourced volumetric video capture program 150 creates a geofence based on the reference area surrounding the received video. If the crowdsourced volumetric video capture program 150 determines a volumetric video should be created based on the received video and additional videos are required to create the volumetric video, the crowdsourced volumetric video capture program 150 may identify a location of capture for the received video and create a geofence around the location of capture. The crowdsourced volumetric video capture program 150 may establish the geofence boundary based on the subject and subject importance of the video. For example, if the crowdsourced volumetric video capture program 150 determines the subject of the received video is a soccer game being played in a stadium, the crowdsourced volumetric video capture program 150 may establish the boundary of the geofence as the outermost seating rows of the stadium. Similarly, if the subject is a parade through city streets, the crowdsourced volumetric video capture program 150 may establish the boundary of the geofence as a preconfigured distance from any direction along the parade route. In one or more embodiments, the crowdsourced volumetric video capture program 150 may utilize a global positioning system to establish pinpointed geographical coordinates of the geofence. In one or more other embodiments, the crowdsourced volumetric video capture program 150 may utilize historical geofence boundaries for similar subject types and a satellite mapping of the area or environment around the subject when determining boundary of the geofence.

In one or more further embodiments, the crowdsourced volumetric video capture program 150 may utilize historical data of subjects similar to the current subject to identify the area to be captured when establishing the geofence and/or subsets of the geofence in which video and/or photographic capture may be more highly desired. For example, the crowdsourced volumetric video capture program 150 may determine that a leftmost hemisphere of a geofenced area is typically a higher priority for video capture based on previous volumetric videos generated of similar subjects. Additionally, the priority of a subset of the geofenced area may be dynamic throughout the lifetime of the subject and the crowdsourced volumetric video capture program 150 may update the priority based on any number of factors, such as time, space, and/or viewership of the volumetric video. For example, if the subject is a basketball game and the geofenced area is the court on which the game is taking place, the crowdsourced volumetric video capture program 150 may generate a subset of the geofenced area to be either side of the court separated by the midcourt line and assign a priority to each subset based on whether the players and basketball are present within that subset since viewers may tend to pay more attention to where the action of the game is currently present. Therefore, the crowdsourced volumetric video capture program 150 may assign lower priority (e.g., lower quality video capture) of a subset of the geofenced area away from the current area of play. The change in priority may influence the weight assigned to each location and/or capture angle as described further in step 212.

Then, at 208, the crowdsourced volumetric video capture program 150 identifies one or more desired locations and one or more capture angles at the one or more locations needed to generate the volumetric video. In order to generate a volumetric video of adequate quality, the crowdsourced volumetric video capture program 150 may require a certain number of videos and/or video feeds captured at specific locations and specific angles. Based on the size and location of the geofence and the video(s) already uploaded to remote server 104, the crowdsourced volumetric video capture program 150 may calculate the number and location of any additional video captures that are required. The crowdsourced volumetric video capture program 150 may identify further locations and angles based on areas within the geofence not currently represented by the already-uploaded videos in remote server 104 and/or areas that have already been captured but are captured in a quality below a threshold level. For example, if an uploaded video was captured in 480p but a 1080i captured video is established as the minimum quality threshold, the crowdsourced volumetric video capture program 150 may require additional video capture of that area.

Once the crowdsourced volumetric video capture program 150 determines which areas require additional video capture, the crowdsourced volumetric video capture program 150 may calculate which locations and angles of capture at those locations are needed. For example, if video capture of a sporting event is missing a part of the field or a specific angle of the field needed to recreate a three-dimensional representation in order to create a volumetric video, the crowdsourced volumetric video capture program 150 may identify a location and/or an angle of capture needed to capture the missing part of the field and complete the required video capture needed to create the volumetric video.

Next, at 210, the crowdsourced volumetric video capture program 150 identifies one or more photographic capture devices within the geofence. In order to capture additional video of the subject within the geofence from the one or more locations, the crowdsourced volumetric video capture program 150 may require users with video capture devices present within the geofence. Therefore, the crowdsourced volumetric video capture program 150 may identify one or more devices capable of photographic capture that are currently present and, in one or more embodiments, opted-into the crowdsourced volumetric video capture program 150 currently within the geofence.

In one or more embodiments, the crowdsourced volumetric video capture program 150 may utilize a third-party mapping application to aide in establishing the identification of one or more users within the geofence and may utilize a global positioning system to establish pinpointed geographical coordinates of each individual within the geofence. The crowdsourced volumetric video capture program 150 may utilize the pinpointed geographical coordinates of each individual within the geofence to further aide in the generation of the volumetric video by determining the relative location of a user to each other user within the geofence and a relative angle of video capture of the subject.

Then, at 212, the crowdsourced volumetric video capture program 150 calculates a weight for each identified photographic capture device based on an importance of a video at each desired relative position. Once the crowdsourced volumetric video capture program 150 identifies the one or more desired locations within the geofence at which video capture is desired any the angle at which each video should be captured at the desired location, the crowdsourced volumetric video capture program 150 may assign a weight that reflects the importance of capture of each video. The importance may be based on the requirement of each video for creation of the volumetric video at a threshold quality. For example, a location and capture angle that is already adequately covered at or above the threshold quality level may receive a low weight. However, a location and capture angle identified in step 208 as being currently missing and needed for creation of the volumetric video may receive a high weight. The crowdsourced volumetric video capture program 150 may also vary the weight assigned to a location and capture angle based on a required redundancy to safeguard continual generation of the volumetric video. For example, the crowdsourced volumetric video capture program 150 may require a video feed from two more users at each location and capture angle in order to ensure ongoing generation of the volumetric video should one of the two users cease video capture.

In one or more embodiments, the crowdsourced volumetric video capture program 150 may base the weight on the number of individuals capable of capturing videos and/or images of the subject that are present in the geofenced area, a subset of the geofenced area, and/or within a threshold distance of a location at which photographic capture is desired. For example, if a large number of individuals capable of capturing video of the subject at the desired location are within a threshold distance of the desired location, the crowdsourced volumetric video capture program 150 may vary the weight lower proportional to the number of individuals since a higher number of users may result in one user capturing the video. Conversely, the crowdsourced volumetric video capture program 150 may vary the weight higher when fewer users are within a threshold distance of the desired location since the chances of a user capturing the video from the smaller group of users is lower. In one or more embodiments, the crowdsourced volumetric video capture program 150 may dynamically modify the weight based on changes in the demand for video capture from the one or more locations and/or the one or more capture angles, such as when videos are uploaded from a specific location and/or capture angle or because of a change in the subject that is either based on location or time. For example, if a user begins capturing video from a highly weighted location and/or angle, the crowdsourced volumetric video capture program 150 may determine that further capture from that location and/or angle is no longer a high priority and modify the weight down. In yet another embodiment, the crowdsourced volumetric video capture program 150 may vary the weight based on a proximity of a user to a desired location and/or capture angle. For example, the crowdsourced volumetric video capture program 150 may increase the weight for a location and capture angle when a user is close in proximity to the location and capture angle.

In one or more embodiments, the weight assigned to a location and/or an angle of capture may relate to the value of an incentive (e.g., monetary or tangible) offered to a user for capturing and uploaded a video and/or video feed of the subject at the location and/or angle of capture.

Next, at 214, the crowdsourced volumetric video capture program 150 presents information relating to the one or more desired relative positions and the weight associated with the desired relative positions to a user associated with each device. The crowdsourced volumetric video capture program 150 may display the weight on a display screen of a user device (e.g., a smartphone display screen) or a user device peripheral (e.g., a smart contact lens or another augmented reality display screen). The crowdsourced volumetric video capture program 150 may further present each location and/or capture angle with the weight juxtaposed in a list to allow for user readability. In one or more other embodiments, the crowdsourced volumetric video capture program 150 may display the location and/or capture angle as a visual display on a map of the geofenced area on the user device display screen or the peripheral device display screen. For example, the crowdsourced volumetric video capture program 150 may display a virtual map of the geofenced area with a pinpoint dot to indicate the location of desired capture and a visual representation of the capture angle using the pinpoint dot location as the origin (e.g., two lines emanating from the location at a 45-degree angle).

In one or more other embodiments, the crowdsourced volumetric video capture program 150 may present directional instructions for each user to traverse the area enclosed by the geofence in order to reach a desired location within the geofence. For example, one a user has indicated an intention to capture a video at a location and capture angle, the crowdsourced volumetric video capture program 150 may present directional instructions, aided by a GPS system, in the form of an arrow on a user device display screen along with a distance measurement to the location. Upon reaching the location, the crowdsourced volumetric video capture program 150 may display an indicator, such as an illuminated box, on the device display screen, such as an augmented reality device display screen, to instruct the user in which direction to orient the image capture device. In an embodiment where the geofence is in an indoor or otherwise enclosed space, the crowdsourced volumetric video capture program 150 may utilize an indoor positioning system. Furthermore, if the geofenced space is not open, such as an outdoor festival might take place in an open, outdoor environment, the crowdsourced volumetric video capture program 150 may utilize a system capable of provide step-by-step directions to the user, such as a navigational system.

In one embodiment, the crowdsourced volumetric video capture program 150, using the video content analysis engine, may identify which portions of the volumetric video may require additional coverage and which other areas may require less coverage based on the existing uploaded videos or video feeds. Furthermore, the crowdsourced volumetric video capture program 150 may transmit guidance, such as augmented reality guidance, to one or more users within the geofence directing the one or more users to one or more locations and/or an angle of capture at the one or more locations needed to achieve the required level of volumetric video coverage and quality. For example, the crowdsourced volumetric video capture program 150 may present GPS guidance to a user wearing a smart contact lens to a location at which video capture is desired and, one at the desired location, present an angle of capture, perhaps as an arrow pointing toward the field of view desired for capture or a box with a border surrounding the desired field of view, each presented in augmented reality to the user.

In another embodiment, the crowdsourced volumetric video capture program 150 may calculate and present varying weights to users with historically higher video capture profiles. For example, the crowdsourced volumetric video capture program 150 may maintain a repository of previous video capture uploads for users and increase the weight applied to a location and/or capture angle specifically for users with a longer and larger history of captured videos since such individuals may be more likely to capture videos in a current instance.

Then, at 216, the crowdsourced volumetric video capture program 150 receives one or more desired videos taken from the one or more desired relative positions based on the presented information. Once a user has captured or being capturing video footage from a location and/or capture angle, the video footage may be uploaded to the remote server 104. For example, if a user repositions to a location and capture angle in a geofenced sports stadium to begin capturing a live video feed of a sporting event using a smart contact lens, the crowdsourced volumetric video capture program 150, locally installed and operating on the augmented reality smart contact lens device, may transmit the captured video feed to another iteration of the crowdsourced volumetric video capture program 150 operating on remote server 104 for storage and compilation with other captured videos and feeds for generation of the volumetric video according to step 218.

In one or more embodiments, the crowdsourced volumetric video capture program 150 may credit a profile associated with the user responsible for capturing the video at the location and/or capture angle according to the weight assigned to the location and capture angle at the time of video capture. The crowdsourced volumetric video capture program 150 may store and access user profile information through blockchain storage. The crowdsourced volumetric video capture program 150 may store a total number of historical video captures for a user, locations of video capture, angles of video capture, a total weight of videos captured by the user, and a total duration of video capture by the user.

Next, at 218, the crowdsourced volumetric video capture program 150 generates a volumetric video using the received video and the one or more desired videos. Upon receiving a threshold number of uploaded videos in the remote server 104, the crowdsourced volumetric video capture program 150 may generate a volumetric video of the geofenced area using the uploaded videos and/or video feeds. The crowdsourced volumetric video capture program 150 may transmit, publish, or allow access to the volumetric video to a user requesting access to the generated volumetric video and utilizing a virtual reality or augmented reality device.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, the computer system comprising:
   one or more processors, one or more computer-readable non-transitory memories, one or more computer-readable tangible storage media, and program instructions stored on at least one of the one or more tangible storage media for execution by at least one of the one or more processors via at least one of the one or more computer-readable non-transitory memories, wherein the computer system is capable of performing a method comprising:
   receiving a video captured by a user of a subject;
   creating a geofence based on a reference area surrounding the received video;
   identifying one or more locations and one or more capture angles needed to generate a volumetric video of the subject;
   calculating and assigning a weight to the one or more locations and/or one or more capture angles based on an importance in generation of the volumetric video, wherein the importance is a threshold value needed for the volumetric video to be created at a threshold video quality level at each location and each capture angle;
   identifying one or more photographic capture devices within the geofence; and
   presenting the one or more locations, one or more capture angles, and the weight assigned to each location and/or each capture angle to a user associated with the one or more photographic capture devices.

2. The computer system of claim 1, wherein the method further comprises:
   receiving one or more additional videos captured from the one or more locations and/or one or more capture angles; and
   generating the volumetric video.

3. The computer system of claim 2, wherein the method further comprises:
   transmitting, publishing, or allowing access to the volumetric video.

4. The computer system of claim 2, wherein the weight is dynamically modified based on receiving the one or more additional videos or a change in the subject.

5. The computer system of claim 1, wherein the presenting further comprises:
   presenting instructions to traverse an area enclosed by the geofence to reach a location in the one or more locations and orient a user device toward a capture angle associated with the location.

6. The computer system of claim 1, wherein the method further comprises:
   determining volumetric video capture is desired through an artificial intelligence analysis of one or more content items of the video, wherein the one or more content items are selected from a group consisting of the subject, a subject type, a subject importance, and a number of people observed in the video.

7. The computer system of claim 1, wherein a boundary of the geofence is determined based on a capture location of the video, the subject, a subject importance, historical geofence boundaries for similar subject types, and a satellite mapping of an environment surrounding the subject.

8. A computer program product, the computer program product comprising:
   one or more computer-readable tangible storage media and program instructions stored on at least one of the one or more computer-readable tangible storage media, the program instructions executable by a processor capable of performing a method, the method comprising:
   receiving a video captured by a user of a subject;
   creating a geofence based on a reference area surrounding the received video;
   identifying one or more locations and one or more capture angles needed to generate a volumetric video of the subject;
   calculating and assigning a weight to the one or more locations and/or one or more capture angles based on an importance in generation of the volumetric video, wherein the importance is a threshold value needed for the volumetric video to be created at a threshold video quality level at each location and each capture angle;
   identifying one or more photographic capture devices within the geofence; and
   presenting the one or more locations, one or more capture angles, and the weight assigned to each location and/or each capture angle to a user associated with the one or more photographic capture devices.

9. The computer program product of claim 8, wherein the method further comprises:
   receiving one or more additional videos captured from the one or more locations and/or one or more capture angles; and
   generating the volumetric video.

10. The computer program product of claim 9, wherein the method further comprises:

transmitting, publishing, or allowing access to the volumetric video.

11. The computer program product of claim 8, wherein the presenting further comprises:

presenting instructions to traverse an area enclosed by the geofence to reach a location in the one or more locations and orient a user device toward a capture angle associated with the location.

12. The computer program product of claim 8, wherein the method further comprises:

determining volumetric video capture is desired through an artificial intelligence analysis of one or more content items of the video, wherein the one or more content items are selected from a group consisting of the subject, a subject type, a subject importance, and a number of people observed in the video.

13. The computer program product of claim 8, wherein a boundary of the geofence is determined based on a capture location of the video, the subject, a subject importance, historical geofence boundaries for similar subject types, and a satellite mapping of an environment surrounding the subject.

14. A processor-implemented method, the method comprising:

receiving a video captured by a user of a subject;

creating a geofence based on a reference area surrounding the received video;

identifying one or more locations and one or more capture angles needed to generate a volumetric video of the subject;

calculating and assigning a weight to the one or more locations and/or one or more capture angles based on an importance in generation of the volumetric video, wherein the importance is a threshold value needed for the volumetric video to be created at a threshold video quality level at each location and each capture angle;

identifying one or more photographic capture devices within the geofence; and presenting the one or more locations, one or more capture angles, and the weight assigned to each location and/or each capture angle to a user associated with the one or more photographic capture devices.

15. The method of claim 14, further comprising:

receiving one or more additional videos captured from the one or more locations and/or one or more capture angles; and generating the volumetric video.

16. The method of claim 15, further comprising:

transmitting, publishing, or allowing access to the volumetric video.

17. The method of claim 15, wherein the weight is dynamically modified based on receiving the one or more additional videos or a change in the subject.

18. The method of claim 14, wherein the presenting further comprises:

presenting instructions to traverse an area enclosed by the geofence to reach a location in the one or more locations and orient a user device toward a capture angle associated with the location.

19. The method of claim 14, further comprising:

determining volumetric video capture is desired through an artificial intelligence analysis of one or more content items of the video, wherein the one or more content items are selected from a group consisting of the subject, a subject type, a subject importance, and a number of people observed in the video.

20. The method of claim 14, wherein a boundary of the geofence is determined based on a capture location of the video, the subject, a subject importance, historical geofence boundaries for similar subject types, and a satellite mapping of an environment surrounding the subject.

* * * * *